United States Patent
Ducourant

(10) Patent No.: US 6,737,654 B2
(45) Date of Patent: May 18, 2004

(54) METHOD FOR TEMPERATURE COMPENSATION OF AN IMAGE DETECTOR

(75) Inventor: Thierry Ducourant, Voiron (FR)

(73) Assignee: Trixell, Moirans (FR)

( * ) Notice: Subject to any disclaimer, the term of this patent is extended or adjusted under 35 U.S.C. 154(b) by 149 days.

(21) Appl. No.: 10/149,451

(22) PCT Filed: Dec. 28, 2000

(86) PCT No.: PCT/FR00/03716

§ 371 (c)(1),
(2), (4) Date: Jun. 27, 2002

(87) PCT Pub. No.: WO01/49023

PCT Pub. Date: Jul. 5, 2001

(65) Prior Publication Data

US 2002/0190216 A1 Dec. 19, 2002

(30) Foreign Application Priority Data

Dec. 28, 1999 (FR) .............................................. 99 16591

(51) Int. Cl.[7] ................................................. G01T 1/24
(52) U.S. Cl. ............................. 250/370.11; 250/370.08; 348/245
(58) Field of Search ...................... 250/370.11, 370.08; 348/245

(56) References Cited

U.S. PATENT DOCUMENTS

| | | | | |
|---|---|---|---|---|
| 5,654,755 A | * | 8/1997 | Hosier | ......................... 348/245 |
| 5,659,355 A | * | 8/1997 | Barron et al. | ................ 348/245 |
| 5,777,495 A | | 7/1998 | Arques et al. | |
| 5,973,327 A | | 10/1999 | Moy et al. | |
| 6,265,737 B1 | | 7/2001 | Ducourant | |
| 6,410,898 B2 | | 6/2002 | Ducourant et al. | |
| 6,661,929 B1 | * | 12/2003 | Smith | ......................... 382/267 |

FOREIGN PATENT DOCUMENTS

| | | |
|---|---|---|
| EP | 0 710 011 | 5/1996 |
| JP | 04 01687 | 1/1992 |

* cited by examiner

Primary Examiner—John R. Lee
Assistant Examiner—Erin-Michael Gill
(74) Attorney, Agent, or Firm—Oblon, Spivak, McClelland, Maier & Neustadt, P.C.

(57) ABSTRACT

A method and device for temperature compensation of an image detector including photosensitive spots sensitive to ambient temperature, each connected to a row conductor and a column conductor. The photosensitive spots are connected by their conductors to a read circuit. The photosensitive spots are divided into detecting photosensitive spots to be exposed to light information corresponding to the image to be detected, the read circuits associated with these photosensitive spots each delivering a measurement voltage representative of the image to be detected, and into blind photosensitive spots protected from the light information, the read circuits associated with these blind photosensitive spots each delivering a dark voltage serving for temperature compensation. During detection of an image the dark voltages are picked up, then an average correction value from the dark voltages coming from one or more detected images is generated, and the average correction value is used to generate a correction voltage to be applied, during detection of a subsequent image, to the read circuits associated with the detecting photosensitive spots so that they deliver a measurement voltage made substantially independent of temperature. Such a method and device may find application in particular to radiological image detectors.

14 Claims, 3 Drawing Sheets

SECTION on bb

METHOD FOR TEMPERATURE COMPENSATION OF AN IMAGE DETECTOR

The present invention relates to a method of temperature compensation of an image detector, which makes it virtually insensitive to temperature fluctuations and which in particular guarantees that it has an approximately constant image dynamic range whatever the temperature.

In this type of image detector, the acquisition of an image takes place with the aid of one or more photosensitive spots each formed from a photodiode and a switch. The photosensitive spots are produced with the aid of techniques for the thin-film deposition of semiconductor materials such as hydrogenated amorphous silicon (aSiH). These photosensitive spots, arranged in the form of a matrix or linear array, make it possible to detect images contained within visible or near-visible radiation. The signals that are produced by said spots are then generally digitized so as to be able to be stored and processed easily.

These arrangements of photosensitive spots find one particularly advantageous application in the medical field or the field of industrial inspection, in which they detect radiological images. All that is required is to cover them with a scintillator and to expose the latter to X-radiation carrying a radiological image. The scintillator converts the incident X-radiation into radiation in the band of wavelengths to which the photosensitive spots are sensitive.

There are now large photosensitive matrices which may have several million photosensitive spots.

Figure 1:
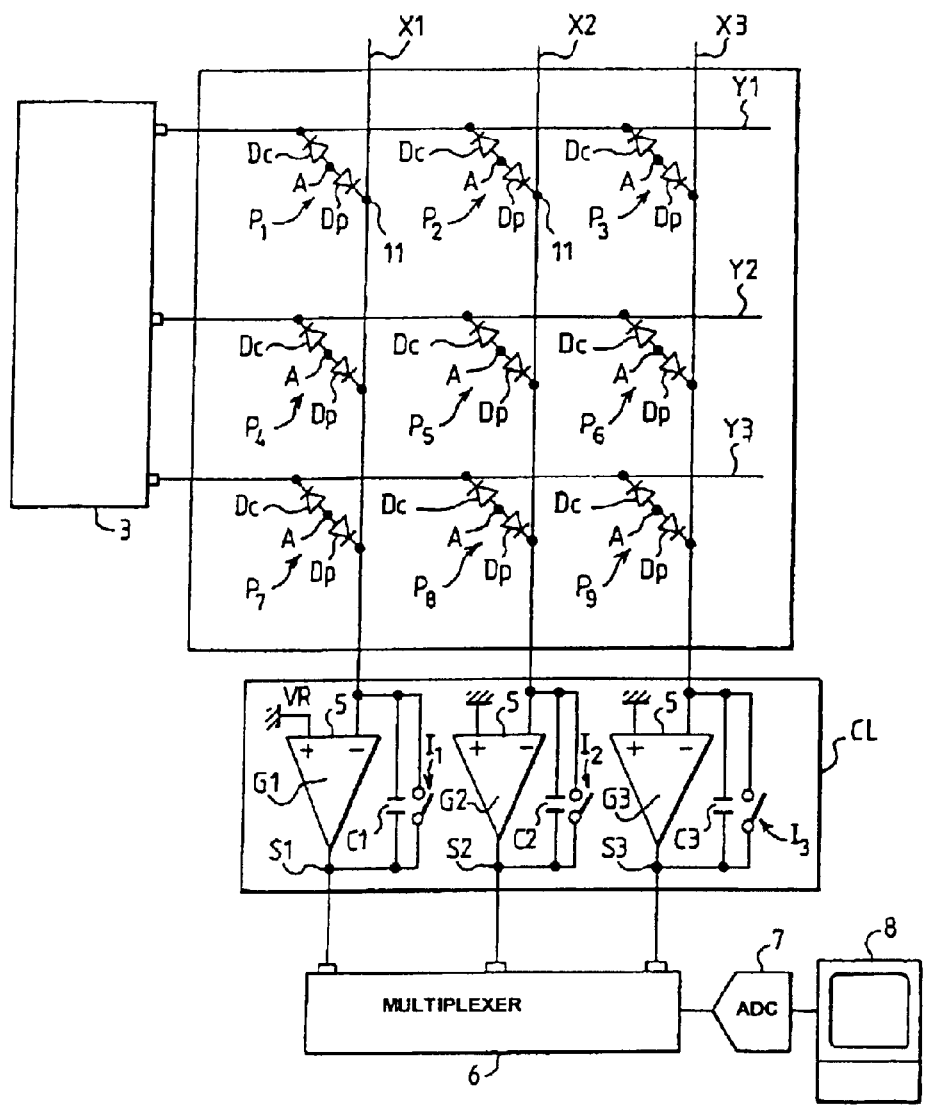

FIG. 1 shows a matrix image detector of known type. It has only nine photosensitive spots in order not to unnecessarily clutter up the figure. Each photosensitive spot P1 to P9 is formed from a photodiode Dp and an element having a switch function Dc represented in the form of a switching diode. It would have been possible to choose a transistor as element having a switching function. The photodiode Dp and the switching diode Dc are connected together in a back-to-back arrangement.

Each photosensitive spot P1 to P9 is connected between a row conductor Y1 to Y3 and a column conductor X1 to X3. The row conductors Y1 to Y3 are connected to an addressing device 3 known as a driver. There may be several drivers 3 if the matrix is of large size. The addressing device 3 generally comprises shift registers, switching circuits and clock circuits. The addressing device 3 raises the row conductors Y1 to Y3 to voltages which either isolate the photosensitive spots P1 to P3 connected to the same row conductor Y1 from the rest of the matrix or turn them on. The addressing device 3 allows the row conductors Y1 to Y3 to be addressed sequentially.

The column conductors X1 to X3 are connected to a read device CL.

During an image record phase, during which the photosensitive spots P1 to P9 are exposed to a signal to be picked up and are in a receiving state, that is to say their reverse-biased photosensitive diodes Dp and switching diodes Dc each constitute a capacitor, there is a build up of charges at the junction point A between the two diodes Dp, Dc. The amount of charge is approximately proportional to the intensity of the signal received, whether this is very intense illumination, provided that the photosensitive diodes remain in the linear detection range, or darkness. There then follows a read phase, during which a read pulse is sequentially applied to the row conductors Y1 to Y3, which read pulse turns on the photodiodes Dp and makes it possible for the charges accumulated in the column conductors X1 to X3 to drain away to the read device CL.

The read device CL will now be explained in greater detail. It consists of as many read circuits as there are column conductors X1 to X3 and these read circuits are of the charge-integrating circuit type 5. Each charge-integrating circuit is formed by an operational amplifier G1 to G3 mounted as an integrator by means of a read capacitor C1 to C3. Each capacitor is mounted between the negative input of the operational amplifier G1 to G3 and its output S1 to S3. Each column conductor X1 to X3 is connected to the negative input of an operational amplifier G1 to G3. The positive input of each of the operational amplifiers, G1 to G3 is taken to a constant input reference voltage VR, which sets this reference voltage on each column conductor X1 to X3. Each operational amplifier G1 to G3 comprises a resetting switch I1 to I3 mounted in parallel with the capacitor C1 to C3.

The outputs S1 to S3 of the integrating circuits are connected to a multiplexing device 6 which delivers, as a series, signals corresponding to the charges which were integrated by the charge-integrating circuits. In the read phase, these signals correspond to the charges accumulated by all the photosensitive spots of the same row. The signals delivered by the multiplexing device 6 are then digitized in at least one analog-to-digital converter 7, the digitized signals output by the analog-to-digital converter 7 translating the content of image to be detected. These digitized signals are sent to a management system 8 which can store, process and display them.

Defects affect the quality of the useful images from such photosensitive devices.

The semiconductor components of the photosensitive spots exhibit remanence which is associated especially with their imperfect crystalline structure. Charges corresponding to an image record phase are not read during the associated read phase and are reproduced during the read phase for a subsequent image. To try to overcome remanence problems, it has been proposed, especially in patent application EP-A-364 314, to add to the charge due to the signal to be picked up a drive charge and to apply, between two read pulses, a bias pulse whose amplitude is generally less than that of the read pulse.

The semiconductor components of the photosensitive spots are not all exactly identical and the matrix of photosensitive spots has locally impaired regions. The components of the read device CL also contribute inhomogeneities.

It is common practice to correct the useful image with what is called an offset image, also known as a "black image". This black image is made at the start of the operating cycle by exposing the image detector, during the image record phase, to a signal of zero intensity, and then carrying out the read phase.

The offset image is produced in the absence of any illumination and the charges read, at the photosensitive spot, during the corresponding read phase, fall within the following three categories. The first represents the drive charges, the value of which is given by:

$$Q = (VP2 - VP1)Cp$$

with:
VP2, the amplitude of the read pulse;
VP1, the amplitude of the bias pulse (these read and bias pulses are delivered by the addressing circuit 3); and
Cp, the capacitance of the photosensitive spot P1 to P9.

The second category of charges corresponds to the charges arising from the leakage current of the photodiode Dp of the photosensitive spot read, this current being established between the application of two successive read pulses or bias pulses.

The third category of charges corresponds to the charges arising from the leakage current emanating from all the photosensitive spots connected to the same column conductor as that which is read, but only during the read phase.

However, it has turned out that although the first category of charges is relatively temperature-stable, the same does not apply in the case of the other two categories of charges. The offset image varies with temperature. This variation may be very significant, for example at 25° C., the electric charge, accumulated at a photosensitive spot of the offset image and converted into a voltage by the charge-integrating circuit 5, may be 0.5 volts, while it may reach up to 2 volts at 50° C.

This phenomenon is annoying; it may be overcome, but in a restricting manner, by recording offset images often and by correcting the useful image with these offset images, at a sufficiently high frequency compared with the thermal time constants of the photosensitive device.

In addition, it turns out that this phenomenon causes other drawbacks, the more one works at high temperature. The dynamic range of the image detector degrades with temperature. The images that it produces become less and less well contrasted as the temperature increases and fewer and fewer shades can be rendered. The dynamic range of the image is degraded.

This is because the analog-to-digital converter 7 has a fixed encoding range for digitizing the voltage values delivered by the multiplexing device 6 for each of the photosensitive spots. A typical value of the encoding range is between 0 volts and 5 volts. If, at 40° C., the level of the offset of a photosensitive spot is 1.8 volts, there remains only 3.2 volts available for encoding the level of this photosensitive spot in the useful image.

The present invention aims to overcome the abovementioned problems associated with the variations in ambient temperature and provides a method for temperature compensation of an image detector making it virtually insensitive to the inevitable fluctuations in ambient temperature.

To achieve this, the method according to the invention is a method for temperature compensation of an image detector comprising photosensitive spots, these being sensitive to ambient temperature, each connected to a row conductor and a column conductor, each of the photosensitive spots being connected via one of its conductors to a read circuit. The photosensitive spots are divided into detecting photosensitive spots, intended to be exposed to light information corresponding to the image to be detected, the read circuits associated with these photosensitive spots each delivering a measurement voltage representative of the image to be detected, and into blind photosensitive spots protected from the light information, the read circuits associated with these blind photosensitive spots each delivering a dark voltage serving for temperature compensation. The method consists, during detection of an image, in picking up the dark voltages, then in generating an average correction value from the dark voltages coming from one or more detected images and in using the average correction value to generate a correction voltage from the average correction value to be applied, during detection of a subsequent image, to the read circuits associated with the detecting photosensitive spots so that they deliver a measurement voltage made substantially independent of temperature.

More particularly, it consists in converting, in an analog-to-digital converter, the measurement and dark voltages of the photosensitive spots and in generating the average correction value from the digitized dark voltages, this average correction value serving to control a digital-to-analog converter which delivers the correction voltage to be applied to the read circuits associated with the detecting photosensitive spots.

It is preferable for the average correction value to be generated by simple averaging over dark voltages coming from several detected images.

Even better results are obtained if the average correction value is generated by sliding averaging over the dark voltages coming from several detected images.

To make the compensation even more effective, the averaging will be compatible with the thermal time constant of the image detector; to do this, the average correction value is generated from dark voltages coming from one or more detected images, the time interval separating the detection of the earliest image from the detection of the most recent image used in the averaging being less than the thermal time constant of the detector.

The present invention also relates to a temperature-compensated image detector comprising photosensitive spots, each connected to a row conductor and a column conductor, each photosensitive spot being connected via one of its conductors to a read circuit. The photosensitive spots are divided into detecting photosensitive spots, intended to be exposed to light information corresponding to the image to be detected, the read circuits associated with these photosensitive spots each delivering a measurement voltage representative of the image to be detected, and into blind photosensitive spots protected from the light information, the read circuits associated with these blind photosensitive spots each delivering a dark voltage used for temperature compensation. It comprises means for picking up the dark voltages during detection of an image and for generating an average correction value from the dark voltages picked up coming from one or more detected images and means for generating, from the average correction value, a correction voltage intended to be applied to the read circuits associated with the detecting photosensitive spots, during detection of a subsequent image, so that the detecting photosensitive spots deliver a measurement voltage made approximately independent of temperature.

The means for picking up the dark voltages and for generating the average correction value receive the dark voltages in digital form from at least one analog-to-digital converter placed between the read circuits and the means for generating the average correction value.

The means for generating the correction voltage comprise a digital-to-analog converter placed between the means for picking up the dark voltages and for generating the average correction value and the read circuits of the detecting photosensitive spots.

The read circuit associated with a detecting photosensitive spot is a charge-integrating circuit comprising a capacitor, one plate of which receives charges from the detecting photosensitive spot via the charge conductor and the other plate of which is at the correction voltage.

The read circuit associated with a blind photosensitive spot is a charge-integrating circuit comprising a capacitor, one plate of which receives charges from the blind photosensitive spot via the conductor and the other plate of which is at a fixed reference voltage.

In a simple manner, so as not to degrade the resolution of the image detector, it is preferable for the blind photosensitive spots to be connected to an outermost portion of a row conductor.

The blind photosensitive spots will be covered with a material opaque to the light information to which the detecting photosensitive spots are exposed, such as black paint.

When the detecting photosensitive spots are covered with a scintillator material which converts X-radiation into light information, the blind photosensitive spots are covered with an X-ray-opaque material such as lead, the opaque material, when it is present, lies between the lead and the blind photosensitive spots.

Figure 2A:
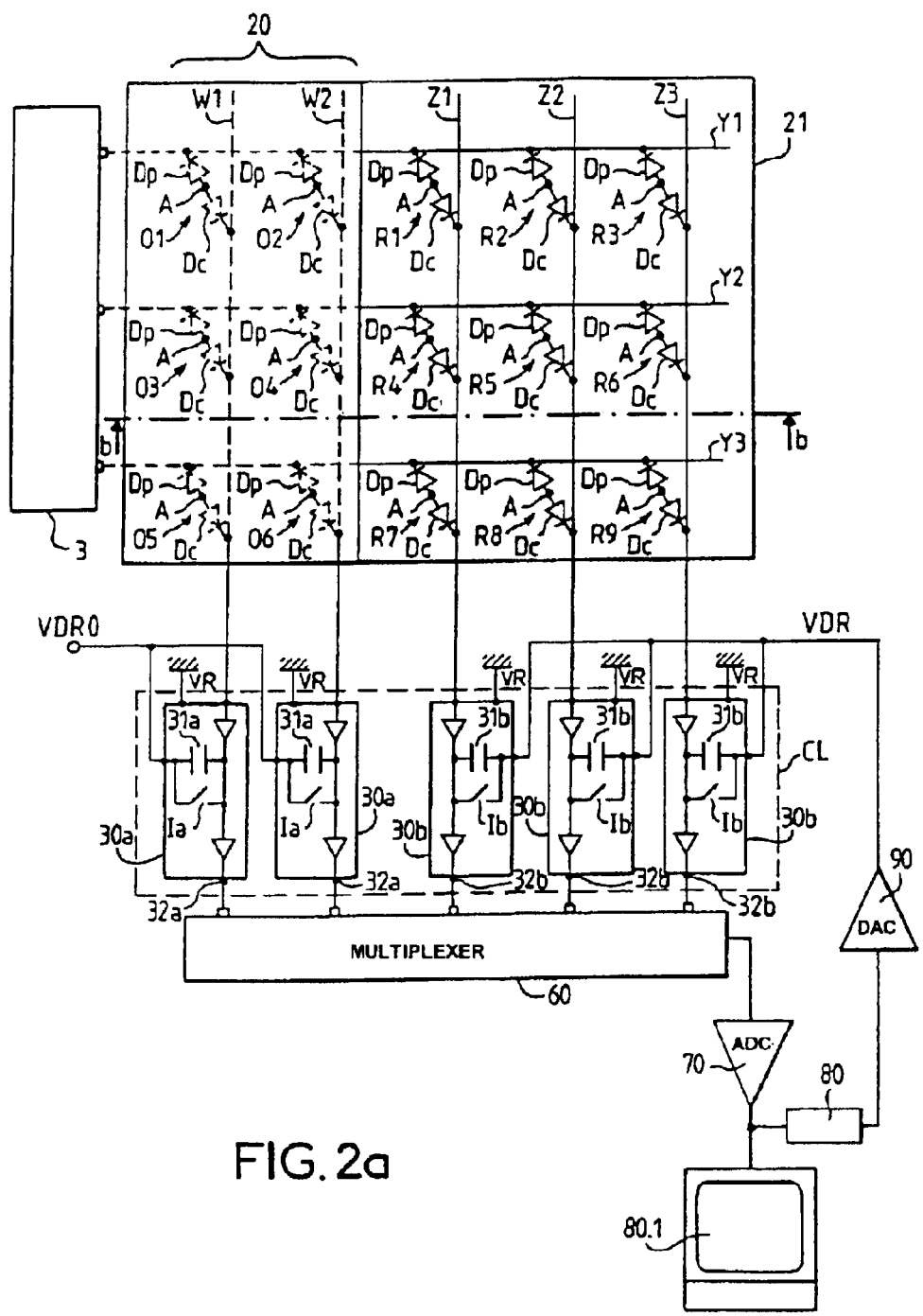
Figure 2B:
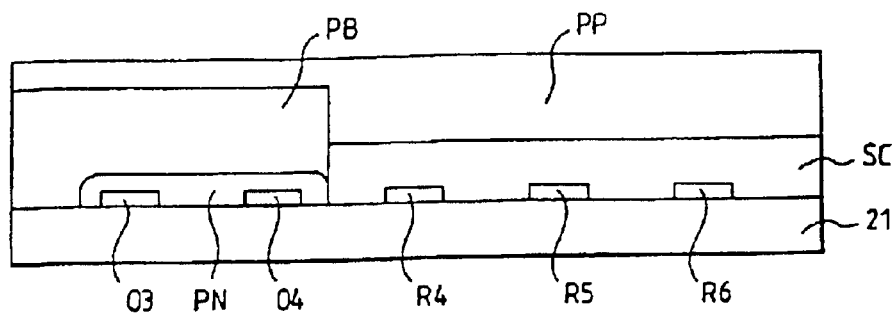

Further features and advantages of the invention will become apparent on reading the description which follows, illustrated by the figures which show:

FIG. 1, already described, a schematic top view of a known image detector;

FIG. 2a, a top view of an example of an image detector according to the invention; and FIG. 2b, a sectional view of the image detector in FIG. 2a.

In these figures, the scales have not been respected for the sake of clarity.

Referring to FIGS. 2a, 2b, the photosensitive spots O1 to O6 and R1 to R9 are shown in the same way as in FIG. 1, with a photodiode Dp and an element having a switch function Dc, shown in the form of a switching diode. This switching diode could have been replaced with a transistor. The photodiode Dp and the switching diode Dc are connected together in a back-to-back arrangement. Each photosensitive spot is connected between a row conductor Y1 to Y3 and a column conductor W1, W2 and Z1 to Z3. The photosensitive spots O1 to O6 and R1 to R9 are arranged in a matrix of rows and columns. Compared with the example in FIG. 1, the image detector has more photosensitive spots and more column conductors, but the same number of row conductors. The row conductors are connected to an addressing device 3 similar to that described in FIG. 1.

According to one feature of the invention, the photosensitive spots are divided into two categories—detecting photosensitive spots R1 to R9, intended to be exposed to light information carrying the image to be detected, and blind photosensitive spots O1 to O6 used for temperature compensation. These blind photosensitive spots O1 to O6 are masked from the light information carrying the image to be detected. During detection of an image, whether this is a useful image or an offset image, the blind photosensitive spots receive nothing. These blind photosensitive spots O1 to O6 will be read in the same way as the detecting photosensitive spots R1 to R9.

The blind photosensitive spots O1 to O6 are connected to outermost portions 20 of the row conductors Y1 to Y3. In the example described they are located at the start of a row, but they could be located at the end of a row.

The number of blind photosensitive spots is not critical—about 10 per row seems reasonable if a row numbers about 2000 detecting photosensitive spots. These photosensitive spots O1 to O6, R1 to R9 are implanted on an insulating substrate with the reference 21.

To mask the blind photosensitive spots O1 to O6 from the light information, they are covered with a material PN opaque to the light information—black paint for example is very suitable.

In the configuration in which the image detector according to the invention is used in a radiological application, the detecting photosensitive spots R1 to R9 are covered with a scintillator material SC which coverts X-radiation into radiation in the band of wavelengths at which the detecting photosensitive spots R1 to R9 are sensitive. As regards the blind photosensitive spots O1 to O6, these are not covered with the scintillator material SC but with an X-ray-opaque material PB, for example a layer of lead. In this configuration, the material PN opaque to the light information is optional, but if some is used it is placed between the blind photosensitive spots O1 to O6 and the X-ray-opaque material PB.

The entire surface of the image detector on that side from which the X-radiation comes is covered with a protective material PP based for example on carbon fibers.

As in the example in FIG. 1, the read device CL comprises as many read circuits 30a, 30b as there are column conductors W1, W2 and Z1 to Z3 and these read circuits are of the charge-integrating type. The circuits 30a are connected to the conductors W1 and W2 and the circuits 30b to the conductors Z1 to Z3. They receive charges via these conductors. Each integrating circuit 30a, 30b also receives, as input, a fixed input reference voltage VR. Each charge-integrating circuit 30a, 30b comprises an integration capacitor 31a, 31b, one plate of which receives the charges via the conductor W1, W2 and Z1 to Z3 to which the integrating circuit 30a, 30b is connected. These charges come essentially from the photosensitive spot which is being read. The other plate of the capacitor 31a, 31b is at a potential which will now be explained. If there is a read circuit 30a connected to a conductor W1, W2 leading to a blind photosensitive spot O1 to O6, this voltage is an absolute reference voltage VDR0. If there is a read circuit 30b connected to a conductor Z1 to Z3 leading to a detecting photosensitive spot R1 to R9, this voltage is a temperature-slaved correction voltage VDR.

The voltage Vs2 present at the output 32b of a read circuit 30b connected to a conductor Z1 to Z3 leading to a detecting photosensitive spot R1 to R9 is then given by:

$$Vs2 = VDR - Q/C$$

where Q is the amount of charge integrated by the integrating capacitor 31b and C is the capacitance of the integrating capacitor 31b.

The voltage present at the output 32a of a read circuit 30a is obtained in a similar manner.

Each integrating circuit 30a, 30b comprises a resetting switch Ia, Ib mounted in parallel with the corresponding integrating capacitor 31a, 31b, respectively.

The outputs 32a, 32b of the read circuits are connected to a multiplexing device 60 which delivers, as a series, signals corresponding to the charges which were integrated by the charge-integrating circuits. In the read phase, these signals correspond to the charges accumulated by all the photosensitive spots of the same line. The signals delivered by the multiplexing device 60 are then digitized in at least one analog-to-digital converter (ADC) 70. The digitized signals are transmitted to a management device 80 which can receive them, that is to say store, process and, optionally, display them.

During a read phase, the read circuits 30b associated with the detecting photosensitive spots R1 to R9 each deliver a measurement voltage corresponding to the exposure received by the detecting photosensitive spot, whereas the read circuits 30a associated with the blind photosensitive spots O1 to O6 each deliver a dark voltage used for effecting the temperature compensation of the image detector since the blind photosensitive spots have not been exposed.

During detection of an image, the dark voltages are picked up and delivered, in digital form as output by the analog-to-digital converter 70, to the management device 80. An average correction value is then generated in the management device from the dark voltages coming from one or more detected images. In FIG. 2a, the management device 80, produced with one or more memories and a computing device, is shown separately from a display device 80.1 which allows the detected images to be displayed. It would be conceivable for the two devices to be combined into one.

There are also means 90 for generating, from the average correction value, the correction voltage VDR to be applied to the read circuits 30b associated with the detecting photosensitive spots R1 to R9, during detection of a subsequent image to be compensated. These means 90 for generating the correction voltage VDR have their input connected to the management device 80 and their output to the read circuits 30b connected to a conductor leading to detecting photosensitive spots. These means are shown in the form of a digital-to-analog converter (DAC) 90.

By applying this correction voltage VDR, the measurement voltages at the output 32b of the read circuits 30b remain substantially independent of temperature.

To improve the effectiveness of the temperature compensation, it is preferable to generate the average correction value by averaging over a large number of images. It is possible to perform a simple averaging, that is to say all the images used for the averaging are assigned the same weight. The effectiveness is improved further if sliding averaging is performed, that is to say the earlier images used in the average are assigned a lower weight than the more recent images.

To further refine the correction, it is preferable to perform an averaging compatible with the thermal time constant of the image detector. For this purpose, the average correction value is generated from dark voltages coming from one or more detected images, the time interval separating detection of the earliest image from detection of the most recent image used in the averaging being less than the thermal time constant of the detector.

This means that if the thermal time constant of the detector is ten minutes, the averaging will take place over at most ten minutes.

What is claimed is:

1. A method for temperature compensation of an image detector including photosensitive spots sensitive to ambient temperature, each connected to a row conductor and a column conductor, each of the photosensitive spots being connected by one conductor to a read circuit, wherein the photosensitive spots are divided into a) detecting photosensitive spots configured to be exposed to light information corresponding to the image to be detected, read circuits associated with the detecting photosensitive spots each delivering a measurement voltage representative of the image to be detected, and b) into blind photosensitive spots protected from the light information, read circuits associated with the blind photosensitive spots each delivering a dark voltage serving for temperature compensation, comprising:

picking up, during detection of an image, the dark voltages;

generating an average correction value from the dark voltages coming from one or more detected images; and using the average correction value to generate a correction voltage to be applied, during detection of a subsequent image, to the read circuits associated with the detecting photosensitive spots so that they deliver a measurement voltage made substantially independent of temperature.

2. The method for temperature compensation of an image detector as claimed in claim 1, further comprising:

converting, in an analog-to-digital converter, the measurement voltages and dark voltages of the photosensitive spots; and generating the average correction value from the digitized dark voltages, the average correction value serving to control a digital-to-analog converter that delivers the correction voltage to be applied to the read circuits associated with the detecting photosensitive spots.

3. The method for temperature compensation of an image detector as claimed in claim 1, wherein the generating the average correction value includes a simple averaging over dark voltages coming from plural detected images.

4. The method for temperature compensation of an image detector as claimed in claim 1, wherein the generating the average correction value includes a sliding averaging over the dark voltages coming from plural detected images.

5. The method for temperature compensation of an image detector as claimed in claim 1, wherein in the generating the average correction value from dark voltages coming from one or more detected images, a time interval separating detection of an earliest image from detection of a most recent image used in the averaging is less than a thermal time constant of the detector.

6. The method for temperature compensation of an image detector as claimed in claim 1, further comprising connecting the blind photosensitive spots to an outermost portion of at least one row conductor.

7. A temperature-compensated image detector including photosensitive spots, each connected to a row conductor and a column conductor, each photosensitive spot being connected by one conductor to a read circuit, wherein the photosensitive spots are divided into a) detecting photosensitive spots, configured to be exposed to light information corresponding to the image to be detected, read circuits associated with the detecting photosensitive spots each delivering a measurement voltage representative of the image to be detected, and b) into blind photosensitive spots protected from the light information, read circuits associated with the blind photosensitive spots each delivering a dark voltage used for temperature compensation, comprising:

means for picking up the dark voltages during detection of an image and for generating an average correction value from the dark voltages picked up coming from one or more detected images; and means for generating, from the average correction value, a correction voltage configured to be applied to the read circuits associated with the detecting photosensitive spots, during detection of a compensated subsequent image, so that the detecting photosensitive spots deliver a measurement voltage made approximately independent of temperature.

8. The temperature-compensated image detector as claimed in claim 7, wherein the means for picking up the dark voltages and for generating the average correction value receives the dark voltages in digital form from at least one analog-to-digital converter placed at an output of the read circuits.

9. The temperature-compensated image detector as claimed in claim 8, wherein the means for generating the correction voltage comprises a digital-to-analog converter placed between the means for picking up the dark voltages and for generating the average correction value and the read circuits of the detecting photosensitive spots.

10. The temperature-compensated image detector as claimed in claim 7, wherein the read circuit associated with a detecting photosensitive spot includes a charge-integrating circuit comprising a capacitor, a first plate of the capacitor receiving charges from the detecting photosensitive spot by the charge conductor and a second plate of the capacitor is at the correction voltage.

11. The temperature-compensated image detector as claimed in claim 7, wherein the read circuit associated with a blind photosensitive spot includes a charge-integrating circuit comprising a capacitor, a first plate of the capacitor receiving charges from the blind photosensitive spot by the conductor and a second plate of the capacitor is at a fixed reference voltage.

12. The temperature-compensated image detector as claimed in claim 7, wherein the blind photosensitive spots are connected to an outermost portion of a row conductor.

13. The temperature-compensated image detector as claimed in claim 7, wherein the blind photosensitive spots are covered with a material opaque to the light information to which the detecting photosensitive spots are exposed.

14. The temperature-compensated image detector as claimed in claim 7, wherein the detecting photosensitive spots are covered with a scintillator material that converts X-radiation into light radiation and the blind photosensitive spots are covered with an X-ray-opaque material, the material opaque to the light information, when it is present, lying between the X-ray-opaque material and the blind photosensitive spots.

* * * * *